United States Patent
Surendran et al.

(10) Patent No.: US 12,530,366 B2
(45) Date of Patent: Jan. 20, 2026

(54) FEDERATION OF DISPARATE DATASETS HOSTED ACROSS SEPARATE SERVERS

(71) Applicant: Oracle International Corporation, Redwood City, CA (US)

(72) Inventors: Venugopal Surendran, Pleasanton, CA (US); Chetna Sureka, San Mateo, CA (US)

(73) Assignee: Oracle International Corporation, Redwood City, CA (US)

(*) Notice: Subject to any disclaimer, the term of this patent is extended or adjusted under 35 U.S.C. 154(b) by 0 days.

(21) Appl. No.: 18/506,528

(22) Filed: Nov. 10, 2023

(65) Prior Publication Data
US 2025/0156438 A1 May 15, 2025

(51) Int. Cl.
*G06F 16/25* (2019.01)
*G06F 9/54* (2006.01)
*G06F 16/242* (2019.01)
*G06F 16/2455* (2019.01)

(52) U.S. Cl.
CPC ............ *G06F 16/256* (2019.01); *G06F 9/547* (2013.01); *G06F 16/242* (2019.01); *G06F 16/2456* (2019.01)

(58) Field of Classification Search
None
See application file for complete search history.

(56) References Cited

U.S. PATENT DOCUMENTS

| | | | |
|---|---|---|---|
| 6,272,488 B1* | 8/2001 | Chang | G06F 16/256 707/999.102 |
| 8,812,490 B1* | 8/2014 | Cappiello | G06F 16/2453 707/718 |
| 12,072,939 B1* | 8/2024 | Batsakis | G06F 16/9032 |
| 2004/0103088 A1* | 5/2004 | Cragun | G06F 16/2471 |
| 2008/0086486 A1* | 4/2008 | Kaler | G06Q 10/00 |
| 2008/0114770 A1* | 5/2008 | Chen | G06F 16/256 |

(Continued)

FOREIGN PATENT DOCUMENTS

CN 113868711 A * 12/2021

OTHER PUBLICATIONS

International Search Report and Written Opinion for PCT/US2024/054926 mailed Feb. 10, 2025, Authorized Officer: Iapichino, Giuliana, 10 pages.

*Primary Examiner* — Augustine K. Obisesan

(57) ABSTRACT

Systems and methods for federating datasets hosted on separate servers are provided herein. An example data federation process includes receiving a federation request that contains a user-defined data domain distributed across two or more datasets hosted on separate servers. The federation request includes a request for first federation data and second federation data. The data federation process includes sending the federation request to the first server, which determines that it hosts the first federation data and determines call information associated with the first federation data. The first server then determines that the second server hosts the second federation data. The first server generates a model query including a procedure call for the first federation data and the second federation data. Upon fetching the first and second federation data based on the model query, the first server combines the first and second federation data together to generate a federated dataset.

20 Claims, 6 Drawing Sheets

(56) References Cited

U.S. PATENT DOCUMENTS

| | | | |
|---|---|---|---|
| 2010/0082671 A1* | 4/2010 | Li | G06F 16/2456 |
| | | | 707/E17.01 |
| 2015/0310067 A1* | 10/2015 | Svoboda | G06F 21/6218 |
| | | | 707/781 |
| 2016/0063060 A1* | 3/2016 | Nguyen | H04L 67/10 |
| | | | 707/770 |
| 2016/0125026 A1* | 5/2016 | Nguyen | G06F 16/2455 |
| | | | 707/713 |
| 2017/0116343 A1* | 4/2017 | Wu | G06F 21/6209 |
| 2021/0081414 A1 | 3/2021 | Jacob et al. | |

* cited by examiner

FEDERATION OF DISPARATE DATASETS HOSTED ACROSS SEPARATE SERVERS

FIELD

The present application generally relates to data federation, in particular, to federation of disparate datasets hosted on separate servers.

BACKGROUND

Data federation, in the realm of data management, is an approach that addresses the challenges of accessing and integrating data from diverse and distributed sources. In an era where organizations accumulate vast amounts of data across various platforms and locations, data federation provides a strategic solution. Instead of physically relocating data to a central repository, data federation seamlessly aggregates and harmonizes data from heterogeneous sources, enabling users and applications to access and query this unified view in real-time. This approach empowers businesses to make informed decisions, drive insights, and harness the full potential of their data assets without the complexity and cost of traditional data consolidation methods.

A common issue, however, with present data federation techniques is the inability to manipulate the data joined by data federation without impacting the original datasets. For example, once the integration of the two datasets is completed via data federation, the integration is permanent and any changes made to the combined data impacts the original data within the datasets. Moreover, the integration is not private. Instead, anyone who has access to one or both of the datasets prior to the federation process, also has access to the federated data after integration.

Furthermore, current data federation techniques is time intensive, often taking weeks if not months to complete integration of two or more disperse datasets. The time intensity is due to the complex nature of data federation. Often, organizations have to hire or direct specialists to handle data federation and, as can be appreciated, the data in the underlying datasets may not be readily available during a data federation process.

Accordingly, there is a need for improved data federation processes. As such, improved systems and techniques for providing data federation functionality are provided herein.

Overview

Technology is disclosed herein for federating disparate datasets hosted on separate servers. Specifically, systems and techniques are provided herein for a data federation process in which data within disparate datasets hosted on separate servers are combined to generate a federated dataset. As will be described in greater detail below, the data federation process includes receiving a federation request from a client device in which the federation request contains a user-defined data domain distributed across two or more datasets. Each dataset is hosted on a separate server. The federation request includes federation request data made up of first federation data and second federation data. The first federation data may be a subset of a first dataset hosted on a first server and the second federation data may be a subset of a second dataset hosted on a second server.

To combine the first federation data and the second federation data into a combined, federated dataset, the data federation functionality, as described herein, includes sending the federation request to the first server. The first server determines that it hosts the first federation data and determines call information associated with the first federation data. The first server then determines that the second server hosts the second federation data in the second dataset. As such, the first server transmits a request to the second server, requesting call information associated with the second federation data from the second server. When the call information for the first federation data and the second federation data is identified, the first server generates a model query including a procedure call for the federation request data. The procedure call includes the call information for the first federation data and the second federation data.

To fetch the federation request data, the first server transmits the model query to the second server. Responsive to receiving the model query, the second server transmits the second federation data to the first server. The first server also retrieves the first federation data from the first dataset that it hosts based on the model query. The first server then joins the first federation data and the second federation data together based on the federation request and generates a federation file containing the federated dataset. The federation file is then transmitted to the client device.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
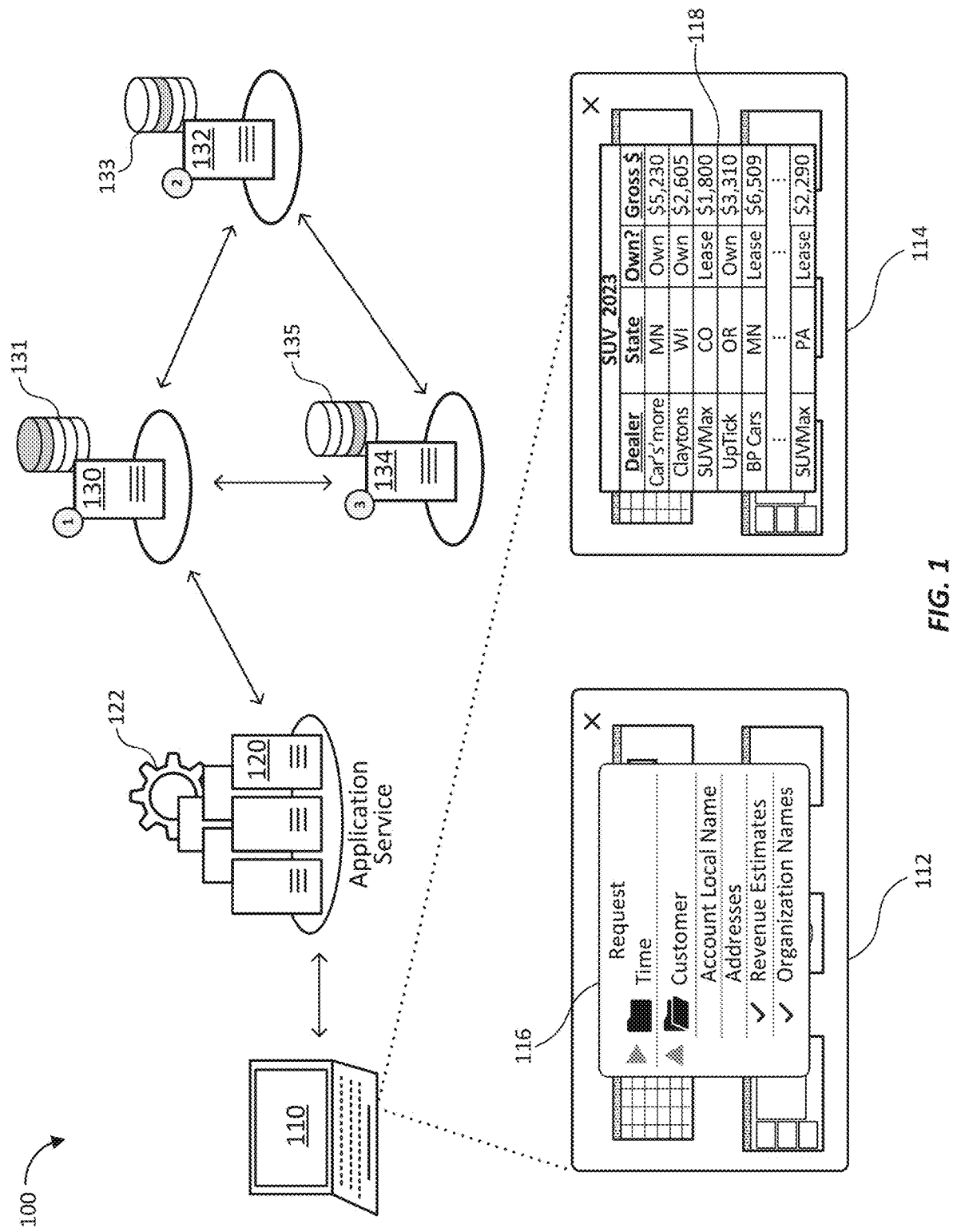
FIG. 1 illustrates an operational environment of a system for providing one or more data federation functionalities, according to an embodiment herein.

Examples are described herein in the context of systems and methods for providing data federation functionalities. Specifically, techniques for providing an improved data federation functionality for generating a combined dataset from two disparate datasets hosted on separate servers are provided. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

As noted above, current data federation processes involve integration of two or more datasets into a single, federated dataset. These processes, however, integrate the original datasets together to generate a combined, federated dataset. As such, the data hosted in the underlying datasets are modified whenever data in the federated dataset is modified. Since organizations generally rely on these datasets as part of their data management structure, access to the federated dataset is the same as access to the original datasets. Accordingly, modification of the federated dataset is likely limited as to not impact the underlying data.

Moreover, the federated dataset is not private. Instead, if a modification is made to the federated dataset, the modification is visible to everyone who has access to the underlying datasets. As can be appreciated, the limited ability to modify the federated dataset without impacting the underlying data and the lack of privacy for any modification made to the federated dataset limits a user's ability to interact with the federated dataset. That is, if a user desires to modify the data provided in the federated dataset based on custom facts when analyzing the data for his or her job role, current data federation techniques would cause those modifications to be performed on the underlying datasets, as well as being visible to everyone. As such, if other users need the federated dataset for their own purposes, such as in the original format, then the modification would impact their analysis.

As can be appreciated, the limited ability to modify the federated dataset impacts an organizations productivity, as users may not be able to modify the data as needed. This can lead to loss of productivity on part of the users and the organization or can cause users to spend time finding alternative routes to analyze the federated dataset according to his or her job role.

Moreover, current data federation techniques are time intensive, often requiring specialists to fully integrate the disparate datasets into a single federated dataset. This can take weeks, if not months, and is a permanent process. Once the federated dataset is generated via present federation techniques, the integration is permanent, and the underlying disparate datasets cannot be separated without an extensive and costly process.

To provide customizable and user-directed data federation of two or more disparate datasets, systems and techniques for providing a data federation functionality is provided herein. Specifically, the data federation functionalities provided herein allow for data federation of two or more disparate datasets that are hosted on separate servers to be combined into a single, federated dataset. As described herein, the data federation functionality integrates subsets of the data within each of the disparate datasets (referred to herein as federation data), as defined by a user, into the federated dataset.

Moreover, unlike conventional federation techniques, the data federation functionalities herein do not impact the underlying datasets. That is, the federated dataset generated by the data federation functionality is separate from the underlying datasets. This not only renders the generated federated dataset private, but it also does not impact the data in the underlying dataset. As such, a requesting user can modify the federated dataset as desired without impacting the data of the underlying datasets.

Furthermore, the data federation functionality herein generates a federated dataset within a few minutes or less. As noted above, current data federation techniques often take weeks if not months, depending on the size of the underlying datasets, to generate a federated dataset. As such, the data federation functionalities provided herein are more time and cost effective than conventional techniques. Additionally, the data federation functionalities can be performed by any user having a software application executing the data federation functionality, as described herein, without the need to hire or direct a specialist to perform the federation process. Accordingly, not only do the data federation functionalities herein provide a faster means of federating disparate datasets, but these functionalities save organizations resources, including providing users the ability to modify data within the disparate datasets as needed to address work tasks, without impeding other users from doing the same or impacting the underlying data.

As will be described in greater detail below, the data federation functionalities provided herein allow a user to generate a federated dataset as needed, including incorporating a custom dataset with data from a general (e.g., organization-wide) dataset, even when these datasets are hosted on separate servers. Moreover, the data federation function provided herein allows for the federated dataset to update data as data in the underlying datasets updates, thereby providing up-to-date data within the federated dataset. Accordingly, the systems and techniques discussed herein provide for improved and more efficient means of federating data hosted across disparate datasets on separate servers.

Turning now to the Figures, FIG. 1 illustrates operational environment 100 of a system providing one or more data federation functionalities, according to an embodiment herein. As illustrated, the operational environment 100 includes an application service 120, servers 130, 132, and 134, a data federation service 122, and a computing or client device 110. The application service 120 hosts an application to endpoints, such as the client device 110. As will be described in greater detail below, the data federation service 122 may be an application or part of an application that is hosted by the application service 120. The client device 110 executes applications locally that provide a local user experience and that interface with the application service 120. The applications running locally with respect to client device 110 may be natively installed and executed applications, browser-based applications, mobile applications, streamed applications, or any other type of application capable of interfacing with the application service 120 and providing a user experience, such as user experiences 112 and 114 displayed on client device 110. Applications provided by the application service 120 may execute in a stand-alone manner, within the context of another application such as a presentation application or word processing application, with a spreadsheet functionality, or in some other manner entirely.

As described herein, the client device 110 is representative of a computing device, such as a laptop or desktop computer, or mobile computing device, such as a tablet computer or cellular phone, of which the computing system is broadly representative. The client device 110 communicates with application service 120 via one or more internets and intranets, the Internet, wired or wireless networks, local area networks (LANs), wide area networks (WANs), and any other type of network or combination thereof. A user may interact with one or more of the applications provided by the application service 120 using a user interface of the application displayed on client device 110. For example, as illustrated, a user may be provided with the user experiences 112 and 114 when displayed on the client device 110. Prompts 116 and 118 illustrate an exemplary user experience of an application environment for an application hosted by the application service 120, according to an embodiment herein. Specifically, the illustrated user experiences 112 and 114, including the prompts 116 and 118, are described in greater detail below with respect to FIGS. 2-5.

Figure 6:
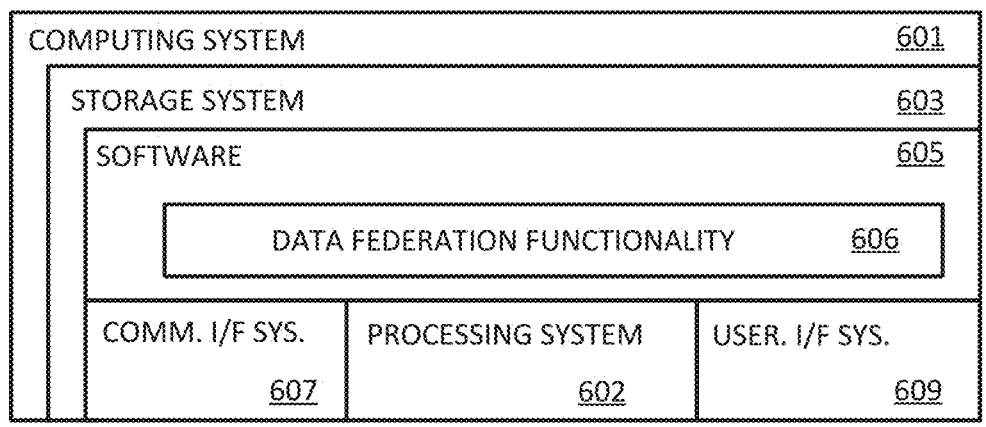
FIG. 6 shows an example computing device suitable for providing one or more data federation functionalities, according to an embodiment herein.

The application service 120 is representative of one or more computing services capable of hosting an application and interfacing with the client device 110 and the servers 130, 132, and 134. Generally, the application service 120 employs one or more server computers co-located or distributed across one or more data centers connected to the client device 110. Examples of such servers include web servers, application servers, virtual or physical (bare metal) servers, or any combination or variation thereof, of which the computing system 601 in FIG. 6 is broadly representative. The application service 120 may communicate with client device 110 via one or more internets, intranets, the Internet, wired and wireless networks, local area networks (LANs), wide area networks (WANs), and any other type of network or combination thereof. Examples of services or sub-services of the application service 120 include—but are not limited to—voice and video conferencing services, collaboration services, file storage services, data management services, and other application services. In some examples, the application service 120 may provide a suite of applications and services with respect to a variety of computing workloads such as office productivity tasks, email, chat, voice and video, and so on.

As provided herein, the data federation service 122 may provide one or more data federation functions. For example, the data federation service 122 may interface with the servers 130, 132, and 134 to federate data as requested by the client device 110. As such, the data federation service 122 may be representative of one or more computing services capable of communicating with the application service 120. The data federation service 122 may be implemented in the context of one or more server computers co-located or distributed across one or more data centers. In some embodiments, the data federation service 122 may be hosted by the same provider as the provider for the application service 120, while in other embodiments, the data federation service 122 may be hosted by a third party.

As noted above, the data federation service 122 interfaces with one or more of the servers 130, 132, and 134. For ease of discussion, the following example will assume that the server 130 is a main or local server, and the server 130 interfaces directly with the data federation service 122. As the main or local server, the server 130 may route communications from the data federation service 122 to an intended destination server, such as to the server 132 and 134. It should be appreciated, however, that any of the servers 130, 132, and 134 may interface with the data federation service 122.

The servers 130, 132, and 134 may be or include one or more server computers co-located or distributed across one or more data centers. Examples of such servers include web servers, application servers, virtual or physical (bare metal) servers, or any combination or variation thereof. The servers 130, 132, and 134 are separate servers, meaning that they are distinct from one another. In some cases, the servers 130, 132, and 134 may be hosted by different parties or the same party. In some cases, the servers 130, 132, and 134 may be hosted by the same party that hosts the application service 120.

As illustrated, each of the servers 130, 132, and 134 hosts one or more datasets 131, 133, and 135, respectively. For example, the server 130 hosts the dataset 131, the server 132 hosts the dataset 133, and the server 134 hosts the dataset 135. In some embodiments, each dataset 131, 133, and 135 contains data from one or more data domains distributed across each of the servers 130, 132, and 134. A data domain, as used herein, refers to a specific category or field of data within the larger dataset, such as customer information or product inventory. As will be described in greater detail below with respect to FIG. 2, each of the datasets 131, 133, and 135 may include a subset of data from the same data domain.

The data federation service 122 is executed by or in association with a user's interaction with a user interface for an application hosted by the application service 120. In the illustrated example, a user of the client device 110 interacts with the application service 120 via a user interface displaying one or more of the user experiences 112 and 114. That is, the user may be provided with the user experiences 112 and 114 via an application environment provided by the application service 120. As illustrated in the user experiences 112 and 114, the application environment displays various information relating to the executing application, such as the prompts 116 and 118. As will be described in greater detail below, the prompt 116 provided via the user experience 112 allows a user to submit a federation request to the data federation service 122. Upon receiving the federation request, the data federation service 122 performs one or more of the data federation functions, as described herein, and returns a federated dataset via the prompt 118, as illustrated in the user experience 114. As described herein, the federated dataset provided in the prompt 118 is provided to the user of the client device 110 within a few minutes or less responsive to submission of the federation request via the prompt 116. Moreover, the federated dataset provided via the prompt 118 does not impact the data hosted in the datasets 131, 133, and 135.

Figure 2:
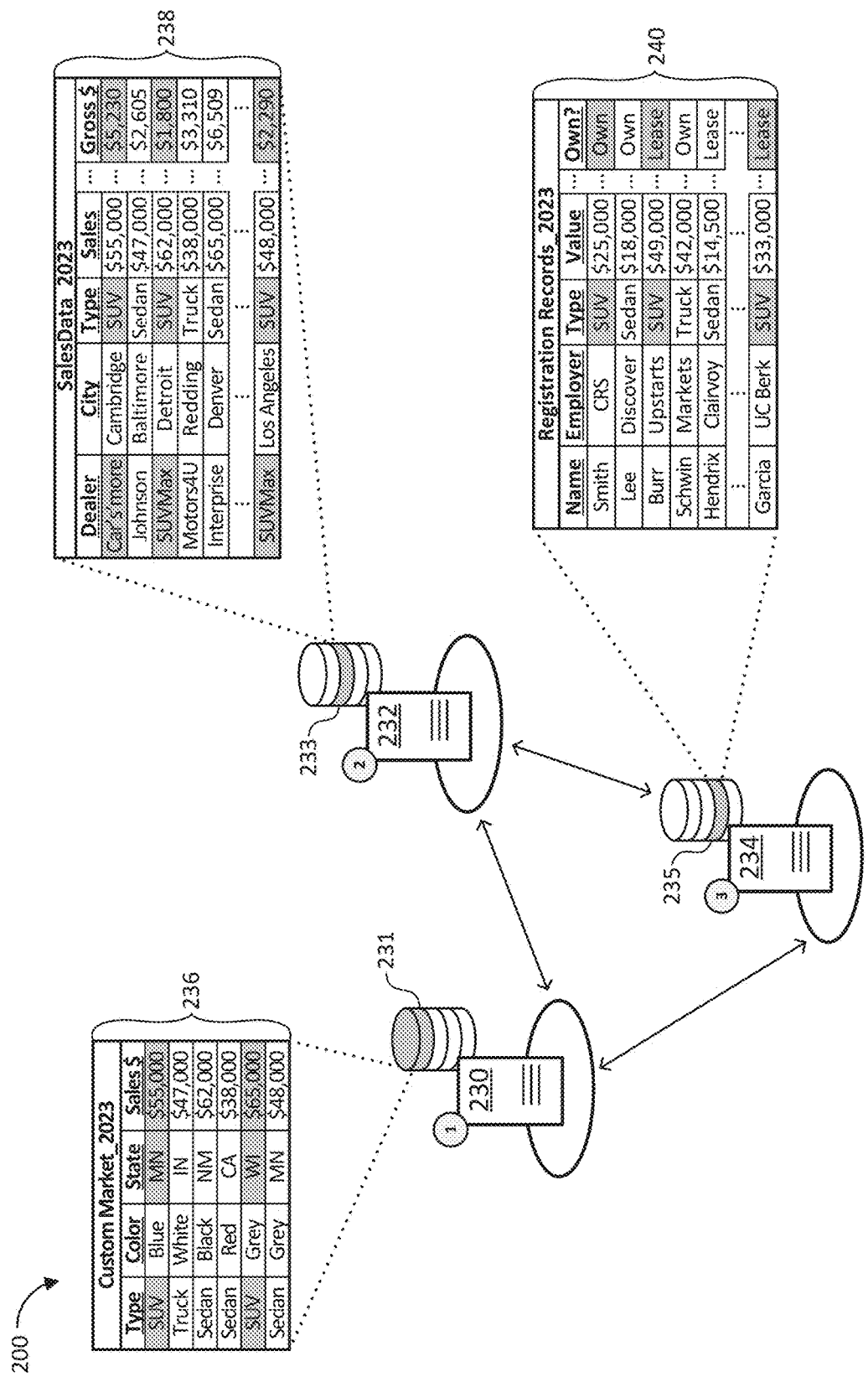
FIG. 2 illustrates an example server system that hosts disparate datasets, according to an embodiment herein.
Figure 3:
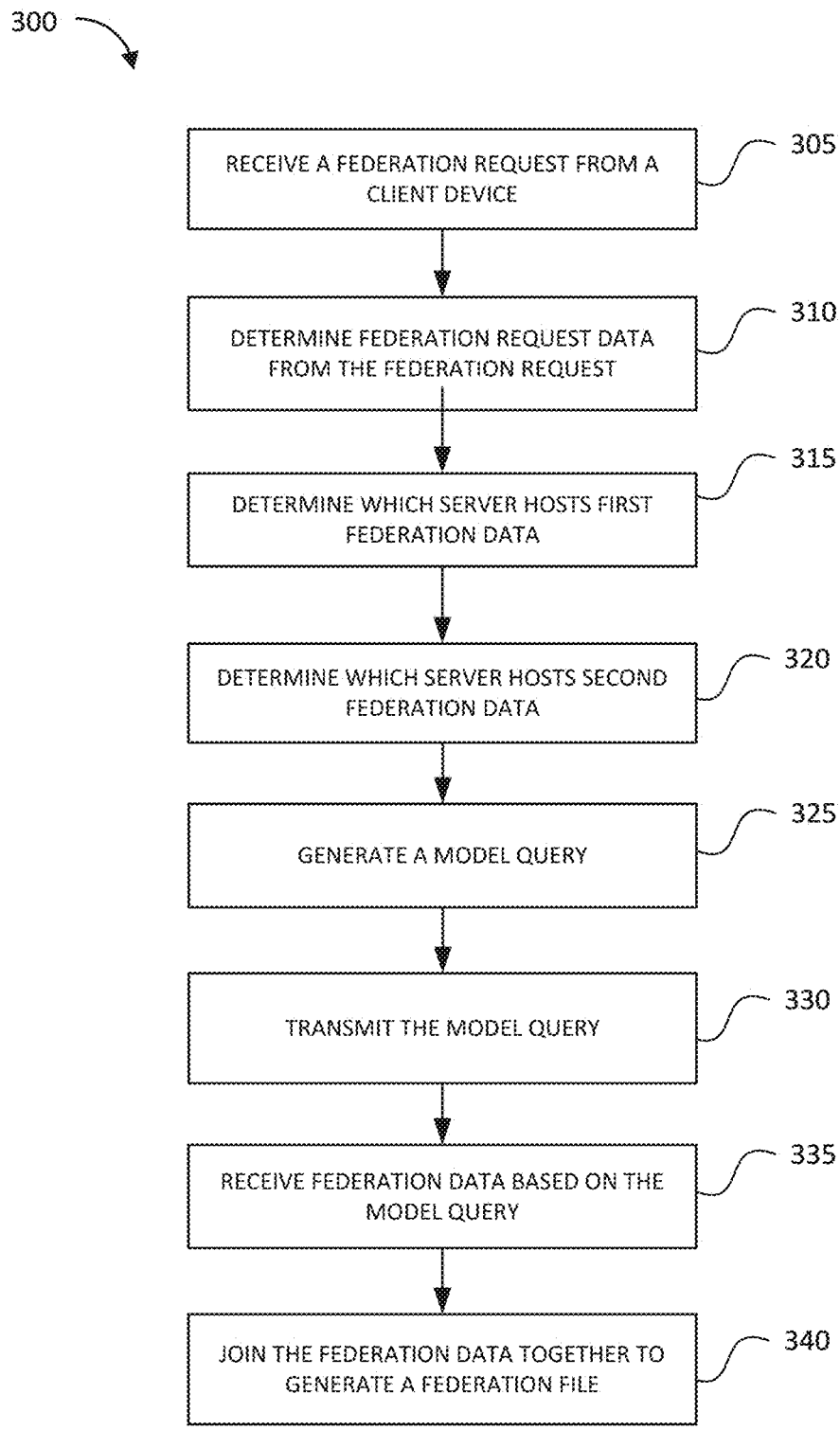
FIG. 3 illustrates an example process for providing data federation functionality, according to an embodiment herein.

Referring now to FIGS. 2 and 3, FIG. 2, FIG. 2 illustrates a server system 200 that hosts disparate datasets and FIG. 3 illustrates an example process 300 for providing the data federation functionality, according to an embodiment herein. For ease of explanation, FIGS. 2 and 3 are described together and with reference to FIG. 1, however, it should be appreciated that elements, steps, or components from any other Figure provided herein may be applicable.

Starting with FIG. 2, the server system 200 includes servers 230, 232, and 234, which may be the same or similar to the servers 130, 132, and 134, respectively, as described above with reference to FIG. 1. Each of the servers 230, 232, and 234 hosts one or more datasets 231, 233, and 235. Although each server 230, 232, and 234 is illustrated as hosting only a singular dataset, it should be appreciated that each server 230, 232, and 234 can host, and likely does host, multiple datasets. For ease of explanation, server 230 is referred to as the first server 230, the server 232 is referred to as the second server 232, and the server 234 is referred to as the third server 234. Similarly, the dataset 231 is referred to as the first dataset 231, the dataset 233 is referred to as the second dataset 233, and the dataset 235 is referred to as the third dataset 235.

The servers 230, 232, and 234 communicate with external connections, such as Data Storage Systems (DSSS), using established network protocols. As those skilled in the art readily appreciate, these protocols define the rules and conventions for data exchange between the servers 230, 232, and 234 and external systems, such as the application services 120 and the client device 110, ensuring compatibility and secure communication. Communications between the servers 230, 232, and 234 are typically transmitted over networks using methods like HTTP, FTP, or custom APIs, allowing the servers 230, 232, and 234 to send and receive communications efficiently and reliably, whether it's for data retrieval, storage, or synchronization with the external systems, including for performing one or more of the data federation functions, as described herein.

With reference to FIG. 3, the process 300 for providing the data federation functionality is illustrated. To initiate the data federation functionality, a federation request is received from the client device 110 (305). For example, the first server 230 receives the federation request from the client device 110. The federation request may be routed to the first server 230 via the application service 120 hosting the data federation service 122. In some embodiments, any federation request received by the data federation service 122 is routed to the first server 230 because the first server 230 is a main server of the server system 200. In other embodiments, however, the data federation service 122 determines that the federation request should be routed to the first server 230 based on the federation request. For example, the federation request includes a user-defined data domain. The user-defined data domain may include data that is distributed across two or more of the datasets 231, 233, and 235. Since each of the datasets 231, 233, and 235 is hosted by a separate server, the data federation service 122 may determine that the first dataset 231 hosted by the first server contains data that is part of the user-defined data domain, and thus route the federation request to the first server 230.

Responsive to receiving the federation request, the first server 230 determines federation request data from the federation request (310). That is, the first server 230 determines what data is requested within the user-defined data domain. As will be further described below with respect to FIG. 5, a user may request data across one or more data domains, such as "Revenue Estimates," "Vehicle Type," and "Registration status." The requested data in the user-defined data domain may be located across the first dataset 231, the second dataset 233, and the third dataset 235.

In fact, the federation request data may be only a subset of the data present in the first dataset 231, the second dataset 233, and the third dataset 235. As illustrated by view 236 of the first dataset 231, the federation request data is the data present in the grey cells. Similarly, the federation request data is the data present in the grey cells of view 238 of the second dataset 233 and the grey cells of view 240 of the third dataset 235. As shown by the greyed cells in each dataset, the federation request data is data that is dispersed throughout the first dataset 231, the second dataset 233, and the third dataset 235.

The subset of the federation request data that is present in the first dataset 231 is referred to herein as the first federation data, the subset of the federation request data that is present in the second dataset 233 is the second federation data, and the subset of the federation request data that is present in the third dataset 235 is the third federation data. Although the present example includes the federation request data distributed across three datasets 231, 233, and 235, hosted by three separate servers 230, 232, and 234, the federation request data may be distributed across any number of datasets, hosted by any number of servers. In some cases, the first and second datasets 231 and 233 may be hosted by the same server 230, while the third dataset 235 is hosted by the second server 232. While in other cases, the federation request data is distributed between the first dataset 231 and the second dataset 233, hosted by the first server 230 and the second server 232.

Once the first server 230 determines that the federation request data includes the first federation data, the second federation data, and the third federation data, the first server 230 then determines which of the federation request data it hosts (315). That is, the first server 230 determines that it hosts the first federation data in the first dataset 231. The first server 230 also determines that the second server 232 hosts the second federation data (320). And in examples, such as the illustrated example, where the federation request data includes the third federation data, the first server 230 determines that the third server 234 hosts the third federation data.

A model query is then generated once the server location of each of the federation data is determined (325). That is, the first server 230 generates a model query containing a procedure call for the federation request data. That is, the model query may be or include an execution plan for fetching federation request data. For example, the procedure call in the model query includes first call information for the first federation data, second call information for the second federation data, and third call information for the third federation data. As used herein, call information corresponds to the location of the federation request data within a respective datasheet. For example, the first call information corresponds to the location of the first federation request data within the first dataset 231, the second call information corresponds to the location of the second federation request data within the second dataset 235, and the third call information corresponds to the location of the third federation request data within the third dataset 235. That is, call information, when transmitted to a respective server, causes the server to provide the data corresponding to queried call information.

In some embodiments, prior to generating the model query, the first server 230 requests the second call information associated with the second federation data from the second server 232. That is, the first server 230 determines that the second server 232 hosts the second dataset 233 and that the second federation data is in the second dataset 233. The first server 230, however, does not have information on the precise location of the second federation data within the second dataset 233. As such, the first server 230 request the second call information associated with the second federation data from the second server 232. Similarly, the first server 230 may request the third call information associated with the third federation data from the third server 234.

Responsive to determining the call information for each of the federation data, the first server 230 generates the model query. As noted above, the model query includes a procedure call that includes the specific call information for each of the federation data. In this manner, when the model query is transmitted to a respective server, the server provides the most up-to-date or current data present at the location associated with the call information from the dataset. That is, when the model query is transmitted to the second server 232, the second server 232 transmits the current data present at the location associated with the second call information from the second dataset 233.

To extract the second federation data, the first server 230 transmits the model query to the second server 232 (330). Similarly, to extract the third federation data, the first server 230 transmits the model query to the third server 234. In some cases, the second server 232 may route the model query to the third server 234. Upon receive of the model query, the second server 232 transmits the second federation data to the first server 230, and the third server 234 transmits the third federation data to the first server 230.

Simultaneously or sequentially, the first server 230 determines the first federation data from the first dataset 231. Once the first server 230 receives the second federation data and the third federation data, the first server 230 joins the first federation data, the second federation data, and the third federation data together based on the federation request (340). That is, the first server stitches the first, second, and third federation data together. Stitching the first, second, and third federation data together can involve combining the subsets of each dataset 231, 233, and 235, or fragments thereof into a unified, coherent federated dataset. This can be done through various techniques like data integration, merging, or joining, creating a comprehensive and interconnected federated dataset of first, second, and third federation data. Once the first, second, and third federation data is joined together as a federated dataset, the first server 230 generates a federation file. The federation file contains the federated dataset. The federation file is then transmitted to the client device 110.

As noted above, the federation file contains the federated dataset based on a subset of data from each of the first dataset 231, the second dataset 233, and the third dataset 235. However, the federated dataset is separate from the datasets 231, 233, and 235 meaning that a user of the client device 110 can modify and analyze the federated data as desired without impacting the datasets 231, 233, and 235. In some cases, the federation file is a local file that the user of the client device 110 can open, modify, and use locally.

Figure 4:
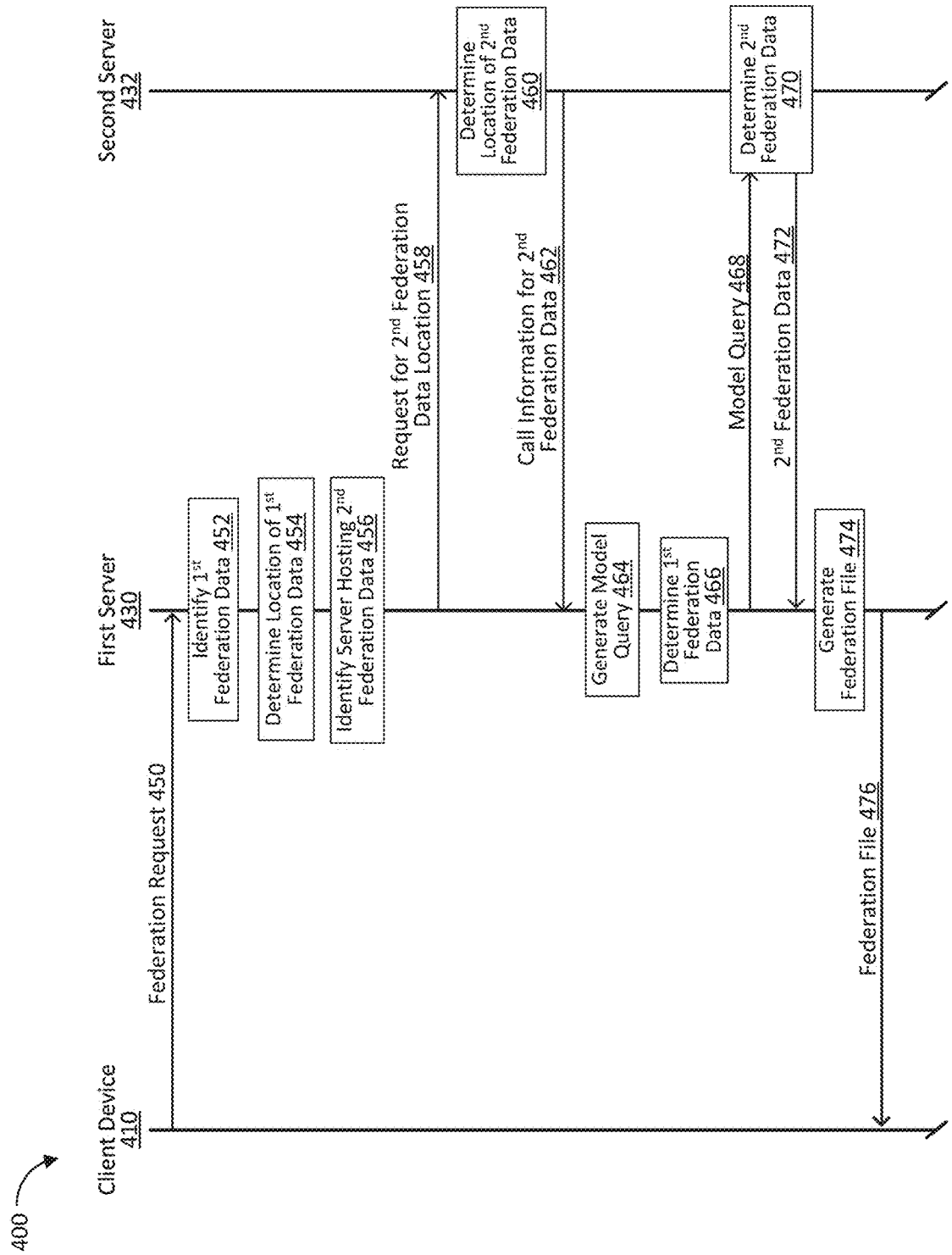
FIG. 4 illustrates an example flow for providing a data federation functionality, according to an embodiment herein.

Turning now to FIG. 4, example flow 400 for providing a data federation functionality is provided, according to an embodiment herein. Although FIG. 4 is described with respect to FIGS. 1 and 2, it should be appreciated that elements, steps, and systems provided by the remaining Figures are equally applicable to the flow 400. As shown, the flow 400 includes a client device 410, a first server 430, and a second server 432. The client device 410 may be the same or similar to the client device 110, the first server 430 may be the same or similar to the first server 230, and the second server 432 may be the same or similar to the second server 232.

To initiate the data federation functionality, the client device 410 submits a federation request 450. For example, the client device 410 may submit the federation request 450 via the user experience 112, such as via the prompt 116. The user experience 112 may correspond to an application executed by the client device 110 and provided by the application service 120. Specifically, the prompt 116 may correspond to the data federation service 122. As such, the federation request 450 is routed to the first server 430.

Responsive to receiving the federation request 450, the first server 430 determines the first federation data 452 from the federation request 450. As described above, the federation request 450 includes a request for federation request data. The federation request data may include first federation data and second federation data, depending on the federation request 450. Here, the federation request data includes the first federation data and the second federation data. As such, the first server 430 identifies the first federation data 452.

That is, the first server 430 determines that it hosts the first federation data 452 as part of a first dataset, such as the first dataset 231. Then the first server 430 determines a location of the first federation data 454, such as determining the first call information associated with the first federation data.

The first server 430 also determines that it does not host the second federation data that is part of the federation request 450. Instead, the first server 430 determines that the second server 432 hosts the second federation data 456. For example, the first server 430 may determine that the second federation data is a subset of data in the second dataset 233 and that the second dataset 233 is hosted by the second server 432. Upon identifying the second server 432 as hosting the second federation data 456, the first server 430 transmits a request for the location of the second federation data 458. In other words, the first server 430 transmits a request to the second server 432 for the second call information associated with the second federation data.

Responsive to receiving the request for the second federation data location 458, the second server 432 may determine the location of the second federation data within the second dataset 233 and transmit the second call information for the second federation data 462 back to the first server 430.

Once the first server 230 determines the first call information associated with the first federation data and receives the second call information for the second federation data from the second server 432, the first server 430 generates the model query 464. As noted, the model query may include an execution plan for fetching the first federation data and the second federation data from the first dataset 231 and the second dataset 233, respectively. Once generated, the first server 230 may determine the first federation data 466 based on the model query, and then transmit the model query 468 to the second server 432 to fetch the second federation data from the second server 432. Responsive to receiving the model query 468, the second server 432 determines (e.g., fetches or retrieves) the second federation data 470 and then transmits the second federation data 472 back to the first server 430. It should be appreciated that determination of the first federation data 466 may be performed simultaneously or sequentially, either before or after, the model query 468 is transmitted to the second server 432 and/or the second federation data 472 is received by the first server 430.

Once the first server 430 receives the second federation data 472 and determines or fetches the first federation data 466 from the first dataset 431, the first server 430 joins the first federation data and the second federation data together. That is, the first server 430 generates a federation file 474 containing the federated data, the federated data being the first federation data and the second federation data stitched together. Once generated, the federation file 476 is transmitted from the first server 430 to the client device 410. As noted above, the application service 120 may host the data federation service 122 that may route the federation request 450 from the client device 410 and the first server 430 and route the federation file 476 from the first server 430 to the client device 410.

Figure 5:
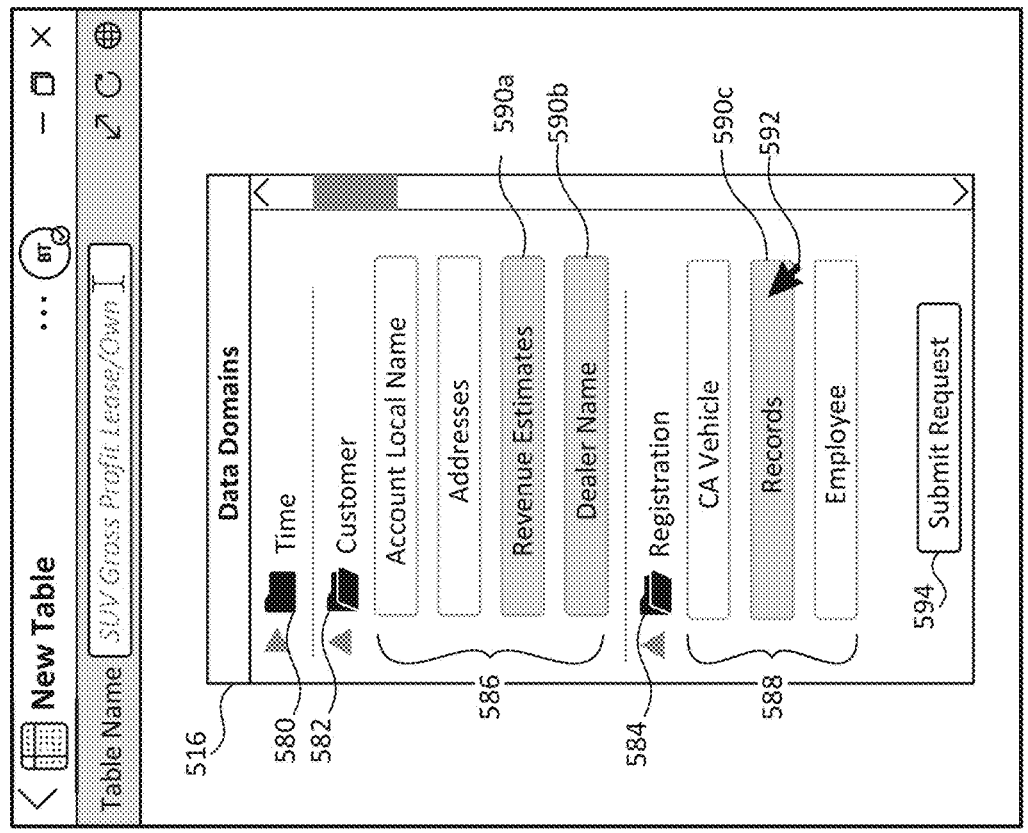
FIG. 5 illustrates a graphical user interface (GUI) for submitting a federation request, according to an embodiment herein.

Referring now to FIG. 5, an example GUI 500 for submitting a federation request is provided, such as the federation request 450. As shown, the GUI 500 provides a federation request prompt 516, which may be the same or similar to the prompt 116 that is provided to a user of the client device 110 during the user experience 112. The prompt 116 may be presented to a user via the GUI 500 when the user navigates to one or more pages provided by an application service, such as the application service 120.

Specifically, the GUI 500 may be provided to the user when the user navigates to pages associated with the data federation service 122.

As shown, the prompt 516 includes various data domains from which a user can select data to federate together. Data hosted by the servers 130, 132, and 134 may be categories for ease of navigation by a user. For example, the data domains may be categorized into a first category 580, a second category 582, and a third category 584. Each category 580, 582, and 584 may include one or more data domains. To see the data domains within each category 580, 582, and 584, the user may select a desired category and the data domains within that respective category may be provided. For example, the second category 582 includes data domains 586 and the third category 584 includes the data domains 588.

Depending on what data the user desires to combine together for analysis purposes, the user selects data domains 590a, 590b, and 590c with cursor 592. As described above, the data associated with the data domains 590a, 590b, 590c may be distributed across one or more datasets hosted by separate servers. For example, a subset of each of the data domains 590a, 590b, and 590c may be hosted in each of the first dataset 231, the second dataset 233, and the third dataset 235. As such, the data federation functionality provided herein is needed combine the data domains 590a, 590c, and 590c together for the user.

Once the desired data domains 590a, 590b, and 590c are selected, the user selects option 594 to submit a federation request. Responsive to selection of the option 594, a federation request, such as the federation request 450 may be submitted by the client device 110 associated with the user, and the process 300 for providing a data federation functionality is performed. A federation file containing a federated dataset including the data from the data domains 590a. 590b, and 590c is provided to the user via the client device 110 responsive to selection of the option 594.

Referring still to FIG. 6, FIG. 6 illustrates a computing system 601 that may be used for providing one or more data federation functionalities, as described herein. For example, the client device 110 may be or include the computing system 601. As illustrated, the computing system 601 includes a processing system 602 that includes a microprocessor and other circuitry that retrieves and executes software 605 from storage system 603. The processing system 602 may be implemented within a single processing device but may also be distributed across multiple processing devices or sub-systems that cooperate in executing program instructions. Examples of the processing system 602 include general purpose central processing units, graphical processing units, application specific processors, and logic devices, as well as any other type of processing device, combinations, or variations thereof.

The storage system 603 may comprise any computer readable storage media readable by processing system 602 and capable of storing software 605. The storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 603 may also include computer readable communication media over which at least some of the software 605 may be communicated internally or externally. The storage system 603 may be implemented as a single storage device but may also be implemented across multiple storage devices or sub-systems co-located or distributed relative to each other. The storage system 603 may comprise additional elements, such as a controller capable of communicating with the processing system 602 or possibly other systems.

The software 605 (including the data federation functionality 606) may be implemented in program instructions and among other functions may, when executed by the processing system 602, direct the processing system 602 to operate as described with respect to the various operational scenarios, sequences, and processes illustrated herein. For example, the software 605 may include program instructions for implementing one or more aspects of the data federation functionality, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 605 may include additional processes, programs, or components, such as operating system software, virtualization software, or other application software. The software 605 may also comprise firmware or some other form of machine-readable processing instructions executable by the processing system 602.

In general, the software 605 may, when loaded into the processing system 602 and executed, transform a suitable apparatus, system, or device (of which computing system 601 is representative) overall from a general-purpose computing system into a special-purpose computing system customized to support insights features, functionality, and user experiences. Indeed, encoding the software 605 on the storage system 603 may transform the physical structure of the storage system 603. The specific transformation of the physical structure may depend on various factors in different implementations of this description. Examples of such factors may include, but are not limited to, the technology used to implement the storage media of the storage system 603 and whether the computer-storage media are characterized as primary or secondary storage, as well as other factors.

For example, if the computer readable storage media are implemented as semiconductor-based memory, the software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive a federation request from a client device, wherein the federation request comprises a user-defined data domain distributed across two or more datasets, each dataset hosted on a separate server; determine federation request data from the federation request, wherein the federation request data comprises first federation data and second federation data; determine that the first federation data is hosted by a first server; determine that the second federation data is hosted by a second server, wherein the second server is a server separate from the first server; generate a model query, wherein the model query comprises a procedure call for the federation request data; transmit the model query to the second server; receive the second federation data based on the model query; join the first federation data and the second federation data based on the federation request; generate a federation file comprising the first federation data and the second federation data joined together; and transmit the federation file to the client device.

Example 2 is the system of any previous or subsequent Example, wherein the processor is further configured to execute processor-executable instructions stored in the non-transitory computer-readable medium to: determine first call information associated with the first federation data on the first server, wherein the first call information corresponds to a location of the first federation data in a first dataset; request second call information associated with the second federation data from the second server, wherein the second call information corresponds to a location of the second federation data in a second dataset; and receive the second call information from the second server.

Example 3 is the system of any previous or subsequent Example, wherein the processor-executable instructions to generate the model query cause the processor to further execute processor-executable instructions stored in the non-transitory computer-readable medium to: generate the procedure call for the model query to comprise the first call information associated with the first federation data and the second call information associated with the second federation data.

Example 4 is the system of any previous or subsequent Example, wherein: the first federation data is a subset of data within the first dataset; and the second federation data is a subset of data within the second dataset.

Example 5 is the system of any previous or subsequent Example, wherein the processor-executable instructions to join the first federation data and the second federation data based on the federation request cause the processor to further execute processor-executable instructions stored in the non-transitory computer-readable medium to: integrate the first federation data and the second federation data together to generate a single federated dataset.

Example 6 is the system of any previous or subsequent Example, wherein the processor-executable instructions to generate the model query cause the processor to further execute processor-executable instructions stored in the non-transitory computer-readable medium to: determine that the federation request data comprises third federation data; determine that the third federation data is hosted by a third server; receive the third federation data from the third server based on the model query; join the first federation data, the second federation data, and the third federation data based on the federation request; and generate the federation file comprising the first federation data, the second federation data, and the third federation data joined together.

Example 7 is the system of any previous or subsequent Example, wherein the processor-executable instructions to generate the model query cause the processor to further execute processor-executable instructions stored in the non-transitory computer-readable medium to: determine first call information associated with the first federation data on the first server, wherein the first call information corresponds to a location of the first federation data in a first dataset; request second call information associated with the second federation data from the second server, wherein the second call information corresponds to a location of the second federation data in a second dataset; request third call information associated with the third federation data from the third server, wherein the third call information corresponds to a location of the third federation data in a third dataset; and generate the procedure call for the model query to comprise the first call information associated with the first federation data, the second call information associated with the second federation data, and the third call information associated with the third federation data.

Example 8 is a method comprising: receiving, by a first server, a federation request from a client device, wherein the federation request comprises a user-defined data domain distributed across two or more datasets, each dataset hosted on a separate server; determining, by the first server, federation request data from the federation request, wherein the federation request data comprises first federation data and second federation data; determining, by the first server, that the first federation data is hosted by the first server; determining, by the first server, that the second federation data is hosted by a second server, wherein the second server is a server separate from the first server; generating, by the first server, a model query, wherein the model query comprises a procedure call for the federation request data; transmitting, by the first server, the model query to the second server; receiving, by the first server, the second federation data based on the model query; joining, by the first server, the first federation data and the second federation data based on the federation request; generating, by the first server, a federation file comprising the first federation data and second federation data joined together; and transmitting, by the first server, the federation file to the client device.

Example 9 is the method of any previous or subsequent Example further comprising: determining, by the first server, first call information associated with the first federation data on the first server, wherein the first call information corresponds to a location of the first federation data in a first dataset; requesting, by the first server, second call information associated with the second federation data from the second server, wherein the second call information corresponds to a location of the second federation data in a second dataset; and receiving, by the first server, the second call information from the second server.

Example 10 is the method of any previous or subsequent Example, wherein the procedure call comprises the first call information associated with the first federation data and the second call information associated with the second federation data.

Example 11 is the method of any previous or subsequent Example, wherein: the first federation data is a subset of data within the first dataset; and the second federation data is a subset of data within the second dataset.

Example 12 is the method of any previous or subsequent Example, wherein the federation request data comprises third federation data hosted on a third server and the method further comprises: determining, by the first server, the third server associated with the third federation data; receiving, by the first server, third call information associated with the third federation data, wherein the third call information corresponds to a location of the third federation data in a third dataset; and generating, by the first server, the model query comprising the third call information associated with the third federation data.

Example 13 is the method of any previous or subsequent Example, wherein joining, by the first server, the first federation data and the second federation data based on the federation request further comprises: generating, by the first server, a first federation dataset based on the model query; generating, by the first server, a second federation dataset responsive to receiving the second federation data from the second server; and joining, by the first server, the first federation dataset with the second federation dataset.

Example 14 is a non-transitory computer-readable medium comprising processor-executable instructions configured to cause one or more processors to: receive a federation request from a client device, wherein the federation request comprises a user-defined data domain distributed across two or more datasets, each dataset hosted on a separate server; determine federation request data from the federation request, wherein the federation request data comprises first federation data and second federation data; determine that the first federation data is hosted by a first server; determine that the second federation data is hosted by a second server, wherein the second server is a server separate from the first server; generate a model query, wherein the model query comprises a procedure call for the federation request data; transmit the model query to the second server; receive the second federation data based on the model query; join the first federation data and the second federation data based on the federation request; generate a federation file comprising the first federation data and the second federation data joined together; and transmit the federation file to the client device.

Example 15 is the non-transitory computer-readable medium of any previous or subsequent Example, wherein the processor-executable instructions stored in the non-transitory computer-readable medium are further configured to cause the one or more processors to: determine first call information associated with the first federation data on the first server, wherein the first call information corresponds to a location of the first federation data in a first dataset, the first federation data being a subset of data within the first dataset; request second call information associated with the second federation data from the second server, wherein the second call information corresponds to a location of the second federation data in a second dataset, the second federation data being a subset of data within the second dataset; and receive the second call information from the second server.

Example 16 is the non-transitory computer-readable medium of any previous or subsequent Example, wherein the processor-executable instructions to generate the model query cause the one or more processors to further execute processor-executable instructions stored in the non-transitory computer-readable medium to: generate the procedure call for the model query to comprise the first call information associated with the first federation data and the second call information associated with the second federation data.

Example 17 is the non-transitory computer-readable medium of any previous or subsequent Example, wherein the processor-executable instructions to request the second call information associated with the second federation data from the second server cause the one or more processors to further execute processor-executable instructions stored in the non-transitory computer-readable medium to: establish a connection with the second server, wherein the connection comprises an external connection between the first server and the second server.

Example 18 is the non-transitory computer-readable medium of any previous or subsequent Example, wherein: the processor-executable instructions stored in the non-transitory computer-readable medium are further configured to cause the one or more processors to: request the first call information associated with the first federation data from the first server; and receive the first call information from the first server; and the processor-executable instructions to generate the model query cause the one or more processors to further execute processor-executable instructions stored in the non-transitory computer-readable medium to generate the procedure call for the model query to comprise the first call information associated with the first federation data and the second call information associated with the second federation data.

Example 19 is a non-transitory computer-readable medium comprising processor-executable instructions configured to cause one or more processors to: transmit a federation request to a first server, wherein the federation request comprises a user-defined data domain distributed across two or more datasets, wherein the two or more datasets comprise a first dataset hosted on the first server and a second dataset hosted on a second server that is separate from the first server; and receive, from the first server, a federation file comprising a federated dataset, wherein the federated dataset comprises first federation data and second federation data joined together, wherein the first federation data is a subset of the first dataset hosted by the first server and the second federation data is a subset of the second dataset hosted by the second server joined together.

Example 20 is the non-transitory computer-readable medium of any previous or subsequent Example, wherein: the two or more datasets comprise a third dataset hosted by a third server that is separate from the first server and the second server; and the federated dataset comprises third federation data that is a subset of the third dataset hosted by the third server joined together with the first federation data and the second federation data.

The invention claimed is:

1. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
 receive, by a first server, a federation request from a client device, wherein:
  the federation request comprises a user-defined data domain distributed across two or more datasets;
  each dataset of the two or more datasets is hosted on a separate server; and
  the user-defined data domain specifies a category of data within each of the two or more datasets;
 determine, by the first server, federation request data from the federation request, wherein the federation request data comprises first federation data and second federation data;
 determine, by the first server, that the first federation data is hosted by the first server;
 determine, by the first server, that the second federation data is hosted by a second server, wherein the second server is a server separate from the first server;
 generate, by the first server, a model query, wherein the model query comprises a procedure call for the federation request data;
 transmit, by the first server, the model query to the second server;
 retrieve, by the first server, the first federation data locally from the first server;
 receive, by the first server, the second federation data based on the model query;
 join, by the first server, the first federation data and the second federation data based on the federation request;
 generate, by the first server, a federation file comprising the first federation data and the second federation data joined together; and
 transmit, by the first server, the federation file to the client device, wherein the two or more datasets hosted on the first server and the second server are unaffected when a modification is made to the first federation data and the second federation data in the federation file.

2. The system of claim 1, wherein the processor is further configured to execute processor-executable instructions stored in the non-transitory computer-readable medium to:

determine first call information associated with the first federation data on the first server, wherein the first call information corresponds to a location of the first federation data in a first dataset;
request second call information associated with the second federation data from the second server, wherein the second call information corresponds to a location of the second federation data in a second dataset; and
receive the second call information from the second server.

3. The system of claim 2, wherein the processor-executable instructions to generate the model query cause the processor to further execute processor-executable instructions stored in the non-transitory computer-readable medium to:
generate the procedure call for the model query to comprise the first call information associated with the first federation data and the second call information associated with the second federation data.

4. The system of claim 2, wherein:
the first federation data is a subset of data within the first dataset; and
the second federation data is a subset of data within the second dataset.

5. The system of claim 1, wherein the processor-executable instructions to join the first federation data and the second federation data based on the federation request cause the processor to further execute processor-executable instructions stored in the non-transitory computer-readable medium to:
integrate the first federation data and the second federation data together to generate a single federated dataset.

6. The system of claim 1, wherein the processor-executable instructions to generate the model query cause the processor to further execute processor-executable instructions stored in the non-transitory computer-readable medium to:
determine that the federation request data comprises third federation data;
determine that the third federation data is hosted by a third server;
receive the third federation data from the third server based on the model query;
join the first federation data, the second federation data, and the third federation data based on the federation request; and
generate the federation file comprising the first federation data, the second federation data, and the third federation data joined together.

7. The system of claim 6, wherein the processor-executable instructions to generate the model query cause the processor to further execute processor-executable instructions stored in the non-transitory computer-readable medium to:
determine first call information associated with the first federation data on the first server, wherein the first call information corresponds to a location of the first federation data in a first dataset;
request second call information associated with the second federation data from the second server, wherein the second call information corresponds to a location of the second federation data in a second dataset;
request third call information associated with the third federation data from the third server, wherein the third call information corresponds to a location of the third federation data in a third dataset; and
generate the procedure call for the model query to comprise the first call information associated with the first federation data, the second call information associated with the second federation data, and the third call information associated with the third federation data.

8. A method comprising:
receiving, by a first server, a federation request from a client device, wherein:
the federation request comprises a user-defined data domain distributed across two or more datasets;
each dataset of the two or more datasets is hosted on a separate server; and
the user-defined data domain specifies a category of data within each of the two or more datasets;
determining, by the first server, federation request data from the federation request, wherein the federation request data comprises first federation data and second federation data;
determining, by the first server, that the first federation data is hosted by the first server;
retrieving, by the first server, the first federation data locally from the first server;
determining, by the first server, that the second federation data is hosted by a second server, wherein the second server is a server separate from the first server;
generating, by the first server, a model query, wherein the model query comprises a procedure call for the federation request data;
transmitting, by the first server, the model query to the second server;
receiving, by the first server, the second federation data based on the model query;
joining, by the first server, the first federation data and the second federation data based on the federation request;
generating, by the first server, a federation file comprising the first federation data and second federation data joined together; and
transmitting, by the first server, the federation file to the client device, wherein the two or more datasets hosted on the first server and the second server are unaffected when a modification is made to the first federation data and the second federation data in the federation file.

9. The method of claim 8 further comprising:
determining, by the first server, first call information associated with the first federation data on the first server, wherein the first call information corresponds to a location of the first federation data in a first dataset;
requesting, by the first server, second call information associated with the second federation data from the second server, wherein the second call information corresponds to a location of the second federation data in a second dataset; and
receiving, by the first server, the second call information from the second server.

10. The method of claim 9, wherein the procedure call comprises the first call information associated with the first federation data and the second call information associated with the second federation data.

11. The method of claim 9, wherein:
the first federation data is a subset of data within the first dataset; and
the second federation data is a subset of data within the second dataset.

12. The method of claim 9, wherein the federation request data comprises third federation data hosted on a third server and the method further comprises:

determining, by the first server, the third server associated with the third federation data;
receiving, by the first server, third call information associated with the third federation data, wherein the third call information corresponds to a location of the third federation data in a third dataset; and
generating, by the first server, the model query comprising the third call information associated with the third federation data.

13. The method of claim 8, wherein joining, by the first server, the first federation data and the second federation data based on the federation request further comprises:
generating, by the first server, a first federation dataset based on the model query;
generating, by the first server, a second federation dataset responsive to receiving the second federation data from the second server; and
joining, by the first server, the first federation dataset with the second federation dataset.

14. A non-transitory computer-readable medium comprising processor-executable instructions configured to cause one or more processors to:
receive, by a first server, a federation request from a client device, wherein:
the federation request comprises a user-defined data domain distributed across two or more datasets;
each dataset of the two or more datasets is hosted on a separate server; and
the user-defined data domain specifies a category of data within each of the two or more datasets;
determine, by the first server, federation request data from the federation request, wherein the federation request data comprises first federation data and second federation data;
determine, by the first server, that the first federation data is hosted by a first server;
retrieve, by the first server, the first federation data locally from the first server;
determine, by the first server, that the second federation data is hosted by a second server, wherein the second server is a server separate from the first server;
generate, by the first server, a model query, wherein the model query comprises a procedure call for the federation request data;
transmit, by the first server, the model query to the second server;
receive, by the first server, the second federation data based on the model query;
join, by a first server, the first federation data and the second federation data based on the federation request;
generate, by the first server, a federation file comprising the first federation data and the second federation data joined together; and
transmit, by the first server, the federation file to the client device, wherein the two or more datasets hosted on the first server and the second server are unaffected when a modification is made to the first federation data and the second federation data in the federation file.

15. The non-transitory computer-readable medium of claim 14, wherein the processor-executable instructions stored in the non-transitory computer-readable medium are further configured to cause the one or more processors to:
determine first call information associated with the first federation data on the first server, wherein the first call information corresponds to a location of the first federation data in a first dataset, the first federation data being a subset of data within the first dataset;
request second call information associated with the second federation data from the second server, wherein the second call information corresponds to a location of the second federation data in a second dataset, the second federation data being a subset of data within the second dataset; and
receive the second call information from the second server.

16. The non-transitory computer-readable medium of claim 15, wherein the processor-executable instructions to generate the model query cause the one or more processors to further execute processor-executable instructions stored in the non-transitory computer-readable medium to:
generate the procedure call for the model query to comprise the first call information associated with the first federation data and the second call information associated with the second federation data.

17. The non-transitory computer-readable medium of claim 15, wherein the processor-executable instructions to request the second call information associated with the second federation data from the second server cause the one or more processors to further execute processor-executable instructions stored in the non-transitory computer-readable medium to:
establish a connection with the second server, wherein the connection comprises an external connection between the first server and the second server.

18. The non-transitory computer-readable medium of claim 15, wherein:
the processor-executable instructions stored in the non-transitory computer-readable medium are further configured to cause the one or more processors to:
request the first call information associated with the first federation data from the first server; and
receive the first call information from the first server; and
the processor-executable instructions to generate the model query cause the one or more processors to further execute processor-executable instructions stored in the non-transitory computer-readable medium to generate the procedure call for the model query to comprise the first call information associated with the first federation data and the second call information associated with the second federation data.

19. A non-transitory computer-readable medium comprising processor-executable instructions configured to cause one or more processors to:
transmit a federation request to a first server, wherein the federation request comprises a user-defined data domain distributed across two or more datasets, wherein:
the user-defined data domain specifies a category of data within each of the two or more datasets; and
the two or more datasets comprise a first dataset hosted on the first server and a second dataset hosted on a second server that is separate from the first server; and
receive, from the first server, a federation file comprising a federated dataset, wherein:
the federated dataset comprises first federation data and second federation data joined together;
the first federation data is a subset of the first dataset hosted by the first server and the second federation data is a subset of the second dataset hosted by the second server joined together; and the first dataset and the second dataset are unaffected when a modification is made to the first federation data and the second federation data in the federation file.

20. The non-transitory computer-readable medium of claim 19, wherein:
the two or more datasets comprise a third dataset hosted by a third server that is separate from the first server and the second server; and
the federated dataset comprises third federation data that is a subset of the third dataset hosted by the third server joined together with the first federation data and the second federation data.

\* \* \* \* \*